(12) United States Patent
Read

(10) Patent No.: US 9,580,618 B2
(45) Date of Patent: Feb. 28, 2017

(54) FILM

(71) Applicant: INNOVIA FILMS LIMITED, Wigton, Cumbria (GB)

(72) Inventor: Simon Read, Wigton (GB)

(73) Assignee: INNOVIA FILMS LIMITED, Wigton, Cumbria (GB)

( * ) Notice: Subject to any disclaimer, the term of this patent is extended or adjusted under 35 U.S.C. 154(b) by 0 days.

(21) Appl. No.: 14/646,311

(22) PCT Filed: Dec. 19, 2013

(86) PCT No.: PCT/GB2013/053363
§ 371 (c)(1),
(2) Date: May 20, 2015

(87) PCT Pub. No.: WO2014/096833
PCT Pub. Date: Jun. 26, 2014

(65) Prior Publication Data
US 2015/0291825 A1   Oct. 15, 2015

(30) Foreign Application Priority Data
Dec. 19, 2012  (GB) .................................. 1222955.5

(51) Int. Cl.
| | | |
|---|---|---|
| B41M 5/26 | (2006.01) | |
| C09D 133/00 | (2006.01) | |
| C09C 1/00 | (2006.01) | |
| C09D 5/00 | (2006.01) | |
| C09D 7/12 | (2006.01) | |
| C08K 3/22 | (2006.01) | |
| C08K 5/18 | (2006.01) | |
| C08K 5/19 | (2006.01) | |
| C08K 5/20 | (2006.01) | |
| B41M 3/14 | (2006.01) | |

(52) U.S. Cl.
CPC ........... *C09D 133/00* (2013.01); *B41M 5/267* (2013.01); *C08K 3/22* (2013.01); *C08K 5/18* (2013.01); *C08K 5/19* (2013.01); *C08K 5/20* (2013.01); *C09C 1/00* (2013.01); *C09D 5/00* (2013.01); *C09D 7/1275* (2013.01); *B41M 3/14* (2013.01); *C01P 2004/60* (2013.01); *C08K 2003/2231* (2013.01); *Y10T 428/2982* (2015.01); *Y10T 428/2998* (2015.01)

(58) Field of Classification Search
CPC ..... C09D 133/00; C09C 1/00; C01P 2004/60; Y10T 428/2998; Y10T 428/2982
See application file for complete search history.

(56) References Cited

U.S. PATENT DOCUMENTS

| 3,753,769 A | 8/1973 | Steiner |
|---|---|---|
| 4,632,869 A | 12/1986 | Park et al. |
| 4,720,716 A | 1/1988 | Ikeda et al. |
| 5,139,926 A | 8/1992 | Liu |
| 5,215,869 A | 6/1993 | Liu |
| 6,376,577 B2 | 4/2002 | Kniess et al. |
| 2012/0010345 A1 | 1/2012 | Edler et al. |
| 2012/0021362 A1* | 1/2012 | Jarvis ..................... B41M 5/285 430/363 |
| 2013/0235145 A1* | 9/2013 | Geuens .................. B41M 3/142 347/232 |

FOREIGN PATENT DOCUMENTS

| DE | 37 38 330 A1 | 5/1988 |
|---|---|---|
| DE | 103 43 704 A1 | 4/2005 |
| EP | 0 023 776 A1 | 2/1981 |
| EP | 0 202 812 A2 | 11/1986 |
| EP | 0 600 441 A1 | 6/1994 |
| EP | 0 764 548 A2 | 3/1997 |
| EP | 1 852 270 A1 | 11/2007 |
| GB | 1 124 886 | 8/1968 |
| GB | 1 134 876 | 11/1968 |
| GB | 1 174 328 | 12/1969 |
| GB | 2 352 824 A | 2/2001 |
| GB | 2 352 854 A | 2/2001 |
| JP | 2000/335129 A | 12/2000 |
| JP | 2009 270990 A | 11/2009 |
| WO | 92/07297 A1 | 4/1992 |
| WO | 2002/074548 A2 | 9/2002 |
| WO | 2005/068207 A1 | 7/2005 |
| WO | 2006/018640 A1 | 2/2006 |
| WO | 2006/051309 A1 | 5/2006 |
| WO | 2006/108745 A1 | 10/2006 |
| WO | 2006/113778 A2 | 10/2006 |
| WO | 2006/114594 A2 | 11/2006 |
| WO | 2006/114600 A2 | 11/2006 |
| WO | 2007/003030 A1 | 1/2007 |
| WO | 2007/045912 A1 | 4/2007 |
| WO | 2007/057367 A2 | 5/2007 |
| WO | 2007/063339 A2 | 6/2007 |
| WO | 2007/088104 A1 | 8/2007 |
| WO | 2007/114829 A1 | 10/2007 |
| WO | 2007/141522 A1 | 12/2007 |
| WO | 2008/050153 A1 | 5/2008 |
| WO | 2008/107345 A1 | 9/2008 |
| WO | 2009/024497 A1 | 2/2009 |

(Continued)

OTHER PUBLICATIONS

Combined Search and Examination Report of International Application No. GB1222955.5 mailed May 23, 2013.

(Continued)

*Primary Examiner* — Betelhem Shewareged

(74) *Attorney, Agent, or Firm* — Ping Wang; Andrews Kurth Kenyon LLP

(57) ABSTRACT

The present invention relates to a film, in particular to a laser writable film, and to substances used therein, and components thereof. The present invention further relates to a method of manufacturing the film, uses thereof and products comprising the film.

19 Claims, 5 Drawing Sheets

(56) References Cited

FOREIGN PATENT DOCUMENTS

| WO | 2009/081385 A2 | 7/2009 | | |
|----|----|----|----|----|
| WO | 2009/093028 A2 | 7/2009 | | |
| WO | 2009/135784 A1 | 11/2009 | | |
| WO | 2010/001171 A1 | 1/2010 | | |
| WO | 2010/029276 A1 | 3/2010 | | |
| WO | 2010/089595 A1 | 8/2010 | | |
| WO | 2010/105735 A1 | 9/2010 | | |
| WO | 2010/112940 A1 | 10/2010 | | |
| WO | 2011/089447 A1 | 7/2011 | | |
| WO | 2011/121265 A1 | 10/2011 | | |
| WO | WO 2012/076354 A2 * | 6/2012 | ............ | B41M 5/323 |
| WO | 2012/114121 A2 | 8/2012 | | |

OTHER PUBLICATIONS

International Search Report of International Application No. PCT/GB2013/053363 mailed Feb. 26, 2014.

\* cited by examiner

FILM

This application is a national stage application of International Patent Application No. PCT/GB2013/053363, filed Dec. 19, 2013, which claims priority to United Kingdom Patent Application No. 1222955.5, filed Dec. 19, 2012. The entirety of the aforementioned applications is incorporated herein by reference.

FIELD

The present invention relates to a film, in particular to a laser writable film, and to substances used therein, and components thereof. The present invention further relates to a method of manufacturing the film, uses thereof and products comprising the film.

BACKGROUND

Polymer films are used in many fields for numerous different uses. Countless different properties are required or desirable depending on the applications in which the films are used. One of the many aesthetic and functional characteristics of a film is the presence and nature of text, images, indicia and other aspects of printed appearance. These function to provide identifying or other useful information or to give a particular appearance for visual appeal or other reasons. They are of particular use where the film is used in packaging.

Many different techniques can be used for printing or marking films and related substrates. Traditionally, substrates have been marked by applying inks and using various printing techniques. More recently, films have been marked using alternative techniques. One such alternative technique is laser marking, whereby laser-sensitive components have been applied to or incorporated within substrates such that laser irradiation can bring about a change in appearance by causing a change in the laser-sensitive components. Laser marking or writing can bring advantages in terms of cost and performance. The desired mark or image can be "printed" without ink, merely by "writing" with a laser. Laser writing is precise and quick, and can be used with materials which are not necessarily flat or uniform. The surfaces of the substrate in most cases do not have their physical characteristics adversely altered (because they do not come into contact with conventional printing apparatus) and the laser writing techniques may be used even where the laser-sensitive components are embedded within the substrate.

One example of a laser-sensitive coating composition is disclosed in WO 2009/024497. This document discloses a composition comprising titanium dioxide in the anatase form and a polymeric binder. The document refers to ultra-violet, visible or infra-red laser irradiation, preferably infra-red laser irradiation. IR absorbers may also be present, for example tungsten suboxide, tungsten bronze, or mixtures of tungsten trioxide, tungsten bronze and metallic tungsten.

Amongst chemicals which can change appearance upon irradiation are certain diacetylene-containing compounds, as disclosed in WO 2009/093028 for example. This document discloses diacetylenes which are polychromic, i.e. which change colour upon irradiation. The polychromic diacetylenes may be present in or on a material so that colour may be imparted to the material, or the colour of the material may be changed upon irradiation. The document discloses that preferred compounds are those which are initially colourless or of low visual colour and which become coloured upon irradiation, and/or compounds which undergo multiple colour changes. For example, the compounds may change from being initially colourless or of low visual colour to become coloured upon irradiation and subsequently to change to a different colour upon further irradiation with the same or different type of radiation. Types of radiation include laser or non-coherent, broadband or monochromatic radiation, ultra-violet, near, mid or far infra-red, visible, microwave, gamma-ray, x-ray or electron beam radiation. The document discloses that, in addition to the diacetylene compounds, there may also be incorporated other compounds which undergo colour change reactions on irradiation, for example "leuco dyes". The document discloses that the polychromic substances may be included in a surface coating formulation or within the bulk of the substrate. The substrates can include thermoplastics.

WO 2009/081385 also discloses diacetylene-containing polychromic materials, and in particular thermoplastic materials comprising polymers and these polychromic substances. The polymers may be polyolefins such as polyethylene, polyethylene terephthalate, polypropylene, or mixtures thereof.

WO 2012/114121 relates to the reversible activation of certain diacetylenes. These undergo a topochemical polymerisation reaction to give coloured diacetylenes only when they are simultaneously exposed to additional activating stimuli. This document discloses that reversible activation is advantageous because the compounds have high environmental stability in coatings or in plastics parts. The diacetylene compounds are applied to or incorporated within substrates, the substrates are then exposed to a first activating stimulus which converts the diacetylene compounds from an unreactive form to a reactive form, and subsequently a second stimulus that causes the reactive form of the diacetylene compound to polymerise and form coloured substrates. On removal of the activating stimulus the diacetylene compound reverts to its unreactive form. The substrate may be packaging.

A different type of laser marking is disclosed in WO 2007/141522. In this document, a non-stoichiometric compound such as reduced indium tin oxide (r-ITO) functions as a highly effective absorber of near infra-red radiation and is useful in combination with a marking component such as an ammonium octamolybdate based ink formulation. The result is to produce a colour-forming reaction in respect of a component that would otherwise undergo the desired reaction on irradiation at a different wavelength.

WO 2010/001171 discloses several different types of diacetylene-containing compounds and their uses to impart colour to materials by subjecting the materials to irradiation. Amongst the preferred colour-forming diacetylenes mentioned in the document are those which are capable of forming at least two distinct colours selected from blue, red, green, cyan, magenta and yellow (particularly preferably those which change from colourless to blue), and those which give rise to electrical conductivity as well as colour on polymerisation.

WO 2007/045912 is particularly concerned with laser imaging of substrates such as paper, card or board. This document discloses a method of marking a substrate comprising the steps of coating the substrate with a white or colourless solution of a soluable alkali or alkaline earth metal salt of a weak acid, and irradiating areas of the substrate to be marked such that those areas change colour.

WO 20006/114594 discloses an example of a printing system and apparatus for the laser marking of a substrate. The apparatus comprises a laser diode for emitting a beam of laser light and a galvanometer for aligning a desired point on the substrate with the laser beam such that the laser beam irradiates the desired point thus causing an additive to change colour at said point. The document discloses that the system may be used on a wide variety of substrate materials, for example, metals, alloys, glasses, ceramics, plastics, fabrics, wood, paper, card, resins, rubbers, foams, composites, stone and edibles.

WO 2006/114600 similarly discloses a substrate marking system and apparatus. The emphasis on this document is on multi-colour printing. Additives are used which are susceptible to changing colour to one of at least two selectable colours upon irradiation, each selectable colour being different from the colour of the additive prior to irradiation. As well comprising a laser diode for emitting a beam of laser light and means for aligning a desired point on the substrate with the laser beam, the apparatus also comprises a means for controlling a fluence level of the laser beam to select the resultant colour of the additive from the selectable colours.

WO 92/07297 discloses a laser imagable composition comprising a particular combination of certain polyacetylenic compounds and certain polycarbocyanine dyes. The compositions are prepared under atmospheric conditions by forming a dispersion, emulsion or suspension, preferably an aqueous dispersion in a binder to provide a dispersion containing from about 1 to about 50%, preferably from about 4 to about 20% of solid polyacetylenic microcrystals. The document states that the polycarbocyanine dyes are effective heat transmitting agents and that only small amounts of these dyes are needed to provide desired absorptions. They are said to transmit heat in excess of a critical temperature of the thermochromic polyacetylenes. The polycarbocyanine dyes disclosed in this document are disadvantageous in terms of their optical properties including their colour and transparency. This document does not disclose inorganic energy absorbers/heat transmitters.

WO 2006/051309 discloses a photothermal recording medium which is a colourless or transparent composition comprising a charge-delocalisation compound and a photoacid, wherein the photoacid generates an acid on irradiation or heating, thereby forming a coloured charge-transfer complex with said compound.

WO 2006/113778 is another document which discloses laser activated thermochromic compositions. The document in particular relates to thin films and coatings of such compositions that undergo an irreversible colour change when heated by laser energy. The use of a stabiliser in the form of a radical trap is essential in accordance with this document. Various different types of thermochromic dyes and stabilisers are disclosed.

EP 0 600 441 discloses a laser marking method comprising irradiating laser light on a thermosensitive colour forming ink layer formed on a substrate, the ink layer being formed by printing with a printing ink comprises a leuco dye as a colour former and an acid substance as a colour developer, in which the printing ink further comprises at least one background colour formation inhibitor selected from the group consisting of a water-soluble amino acid, an ammonium salt of an inorganic acid, a pH buffer, and water.

WO 2007/114829 is a further document which is concerned with laser marking and in particular relates to a coating composition which can be used in the product and package labeling field. This document discloses a coating composition comprising electron donor dye precursor particulars encapsulated with a polymer having a glass transition temperature Tg, of from about 150° C. to about 190° C. The document discloses specific electron donor dye precursors as being suitable including fluorine and phthalide compounds. The high temperatures disclosed in this document are disadvantageous in terms of suitability with various polymeric films some of which can only be handled at low temperatures.

WO 2007/057367 discloses tetrabenzodiazadiketoperylene pigments for laser marking. This produces a florescent marking readily apparent under UV light but not readily apparent under ambient light. The document states that this could be useful in for example security marking and brand identification of printed packaging.

EP 1 852 270 relates to laser marking in the context of laminates. One of the layers in the laminate is a transparent thermoplastic resin exhibiting good light transmittance. Another layer comprises a thermoplastic polymer composition containing a chromatic colorant and a black substance in particular ratios. The laminate can be marked in two or more different colour tones by irradiating with two or more laser lights having different energies from each other.

EP 0 764 548 discloses a thermosensitive recording adhesive label sheet comprising various components. A layer is included which comprises an electron donating colouring compound (leuco dye) serving as a colouring agent and an electron accepting compound serving as a colour developer (capable of inducing colour formation in said leuco dye upon application of heat thereto). Other components in the product include a support, a protective layer, an adhesive layer and a disposable backing sheet.

WO 2010/112940 is another document which relates to the use of certain diacetylenes in laser imaging. This document discloses applying activable colour forming compounds to substrates wherein the activable colour forming compounds are initially unreactive but become reactive upon activation. The colour forming compound may be activated in the areas of the substrate were the image is to be formed, followed by reacting the activated colour forming compound into its colour form to produce an image.

WO 2007/003030 discloses acetal copolymers which are thermally reactive near-infra-red absorbing copolymers. The focus is on the production of lithographic printing plates for computer-to-plate and digital offset press technologies, photo resist applications, rapid prototyping of printed circuit boards, and chemical sensor development. The copolymer may be used in the preparation of a coating for use in those product.

WO 2006/018640 relates to multi-colour printing using laser marking with polydiacetylene chemicals. The document states that the polydiacetylenes typically exhibit a colour (or a shade of colour) dependent on the degree of polymerisation and therefore that by controlling the degree of polymerisation of a diacetylene, a variety of colours from blue through to red and possibly even yellow can be produced. In other words, multi colour printing can be achieved simply and specifically, especially by using one or more UV lasers. The method in this document comprises applying a combination of a diacetylene and a photo acid or photo base, and polymerising the diacetylene by radiation, preferably UV radiation, in order to form an image. Polymerisation may occur to differing degrees in different areas, and the laser may be tuneable.

U.S. Pat. No. 6,376,577 discloses laser-markable plastics which comprise, as &pant, graphite particles having one or more coatings. This enables high contrast to be achieved.

U.S. Pat. No. 5,139,926 and U.S. Pat. No. 5,215,869 disclose preparation of a supported modulating film having a permanent yellow imaged layer of the homopolymer of 10,12-docosadiyndioc acid monomer.

US 2012/00103045 discloses an intrinsically markable laser pigment in the form of a reducible metal compound.

GB-A-2352854 discloses laser markable materials comprising a thermoplastic elastomeric polymer, pigmented with titanium dioxide.

WO 2010/029276 relates to laser imaging and its use in security applications. This discloses a method of forming an invisible indicium on an article that comprises an outer opaque layer and an inner, laser-imagable layer, which comprises irradiating the article with a laser, whereby the laser radiation passes through the opaque layer, and causes the laser-imagable layer to change colour. The article can be scanned as a security check. Thus, laser imaging is said to be useful in order to mark articles with covert indicia in order to prevent counterfeiting, forgeries and ID theft. This is disclosed as potentially being useful with official documents such as passports, identity cards, bank notes, high branded value goods, pharmaceutical compositions, foodstuffs and pin numbers or other access codes.

WO 2005/068207 is a further document relating to the use of functional IR-absorber/colour developers to enhance laser imaging. For example, certain copper salts are useful in order to bring about a colour-forming reaction that would otherwise occur only at a different wavelength.

WO 20/074548 discloses yet further laser-markable compositions wherein the ink composition comprises a solvent, a binder (preferably but not essentially having a labile group) and an oxyanion of a multivalent metal. The metal oxyanion is preferably ammonium octamolybdate.

WO 2006/108745 discloses coating compositions which yield coloured images of good intensity and durability, which can be modulated in order to achieve either transparent or opaque coatings. Various different compounds are disclosed. The document discloses exposing the parts of the coated substrate, where a marking is intended, to energy in order to generate a colour marking. The energy may for example be infra-red irradiation.

WO 2007/088104 discloses a composition which comprises a latent activator and a colour former. The latent activator may be an acid derivative or a salt of an acid and an amine. The colour former may be selected from various groups including phthalides, fluorans, trarylmethanes, benzoxazines, quinazolines, spiropyrans, quinones, thiazines and oxazines and mixtures thereof. The substrate may be marked by coating a substrate with the composition and exposing those parts of the coated substrates, where a marking is intended, to energy (for example UV, IR, visible or microwave irradiation) in order to generate a marking.

WO 2011/089447 is another case relating to apparatus and systems used for inkless printing. There is a substrate which includes material susceptible to change colour upon irradiation, a radiation source operable to produce radiation at two or more distinct wavelengths, and means for controlling the emission of radiation from the radiation source so as to controllably irradiate selected areas of the substrate with desired quantities of radiation from the radiation source so as to mark the substrate in a desired manner.

WO 2008/107345 discloses a laser-sensitive recording material. There is a substrate coated with a recording layer and an undercoating layer. The recording layer undergoes a colour change on heat treatment produced by laser irradiation and the undercoating layer comprises a pigment.

WO 2008/050153 relates to a laser markable composition comprising a marking component and an organic compound, wherein the organic compound absorbs laser light and causes the marking components to change colour. The organic compound is defined in terms of its absorptivity ratio and various possible organic compounds are disclosed.

WO 2007/063339 discloses a laser imagable marking composition comprising a dye responsive to the presence of hydrogen ions but substantially non-responsive to irradiation or heating, a compound that generates an acid on irradiation or heating, and a binder. The acid-generating compound may be responsive to irradiation, for example near infra-red radiation or UV irradiation. The document discloses that effective marking can be achieved in a variety of colours. The composition is stated as being typically initially colourless or transparent and can be used to mark a substrate or polymer matrix effectively, using non-visible radiation.

Yet further examples of diacetylene laser-writable pigments are disclosed in WO 2010/089595 and WO 2011/121265.

BRIEF DESCRIPTION OF THE DRAWINGS

The present invention will now be described in further non-limiting detail and with reference to the Figures in which.

DETAILED DESCRIPTION

Figure 1:
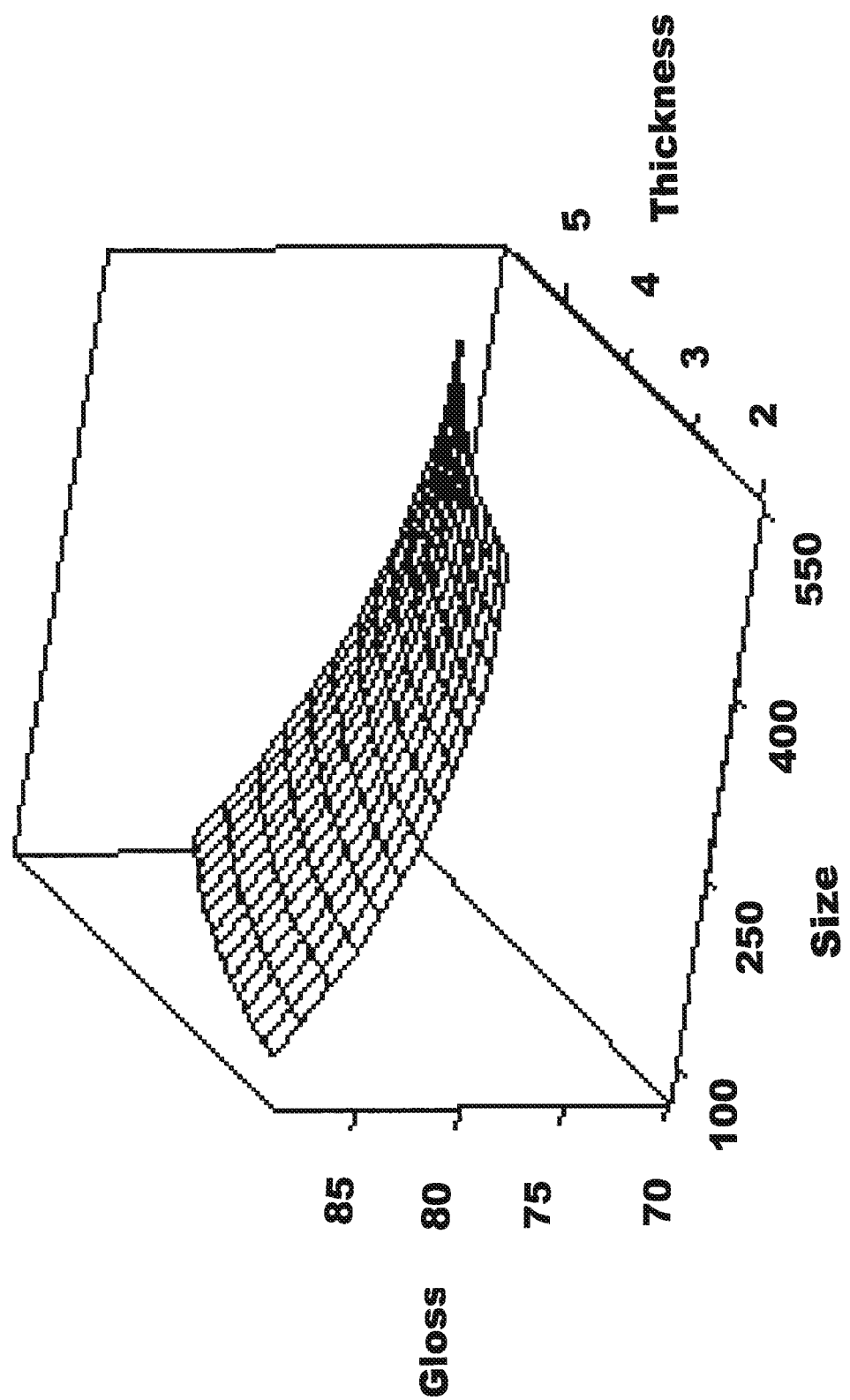
FIG. 1 is a surface plot showing the effect of laser-writable pigment particle size and coating thickness on the gloss of a film which has been laser-treated.
Figure 2:
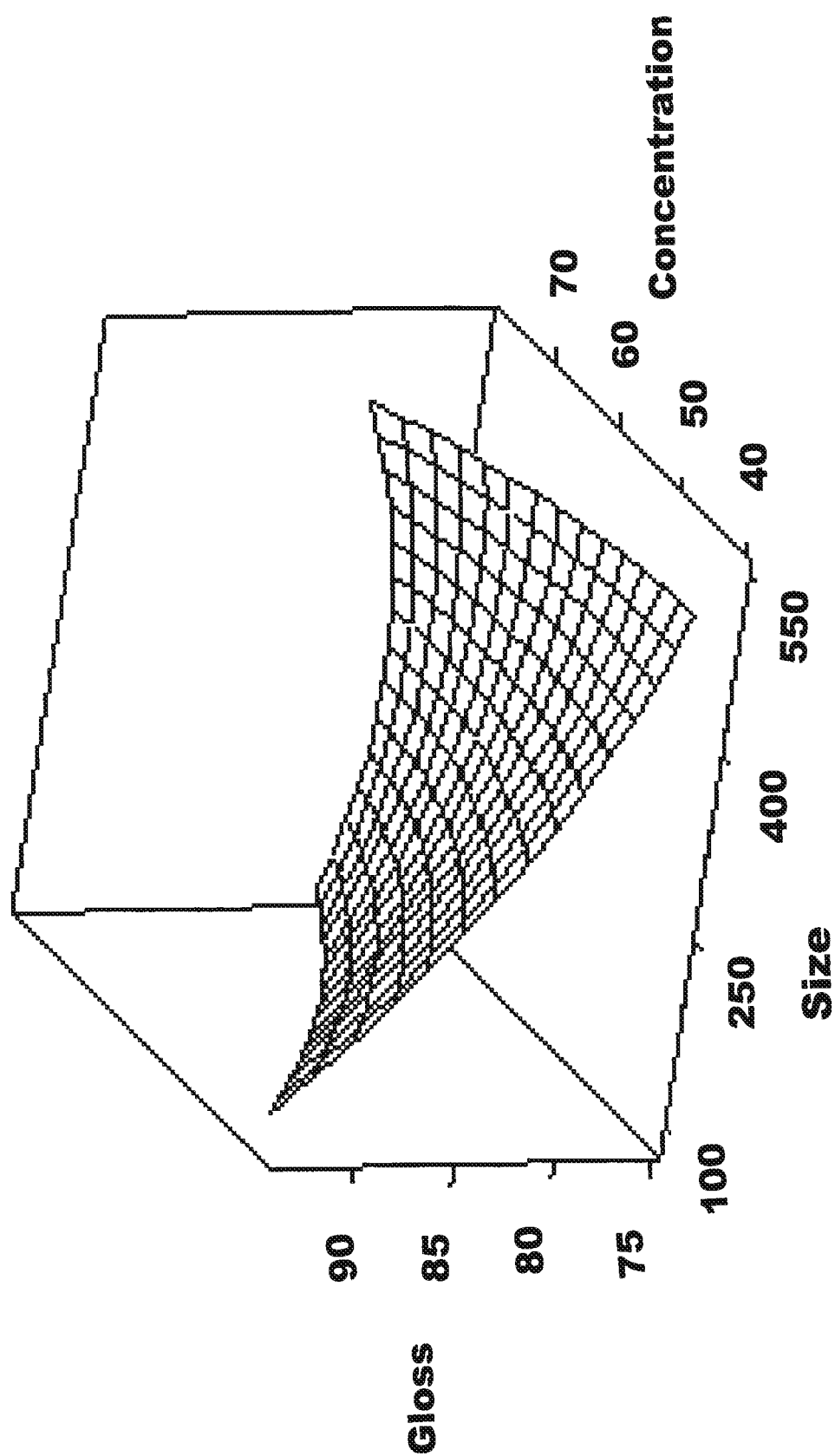
FIG. 2 is a surface plot showing the effect of laser-writable pigment particle size and concentration on the gloss of a film which has been laser-treated.
Figure 3:
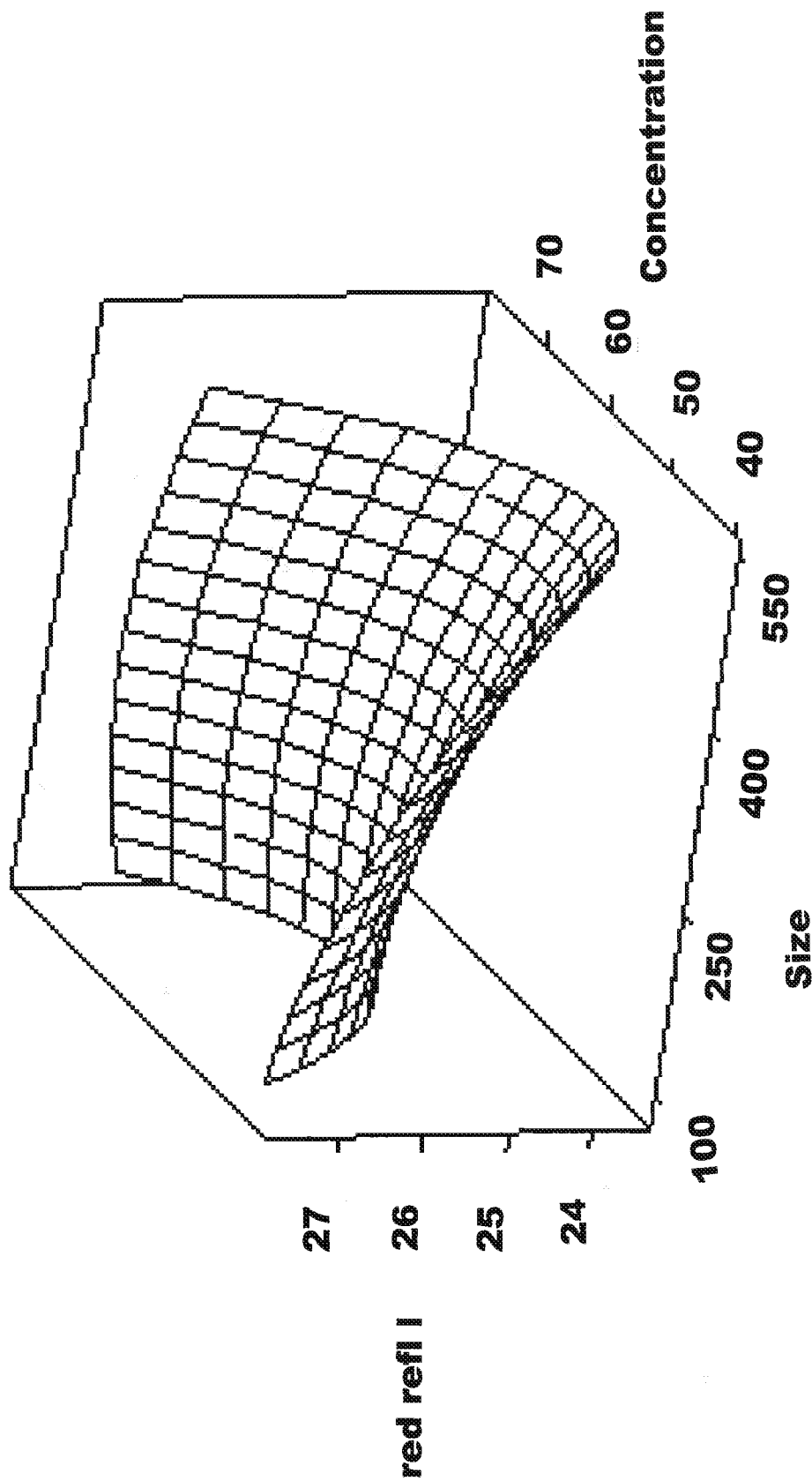
FIG. 3 is a surface plot showing the effect of laser-writable pigment particle size and concentration on the red reflection 1 values of a film which has been laser-treated.

Whilst there have been significant developments in the field of laser writable substrates over the past few years, improvements are desirable in several areas. Many of the substrates or films on which the laser writing is carried out are not suitable for certain downstream processes. In addition, many of the existing laser writing technologies are inefficient in terms of the laser power required to achieve satisfactory results.

One object of the present invention is to enhance the efficiency with which desired optical properties can be obtained when laser writing. A further object of the present invention is to facilitate the applicability of laser writability to a wide range of products and processes, and in particular so that the films are suitable for downstream processes in the films field, for example in labels such as pressure sensitive labels.

From a first aspect the present invention provides a composition comprising a laser writable pigment wherein at least 50% of the laser writable pigment particles have a particle size of less than about 1 micrometer.

The composition may be transparent prior to laser writing. The composition may also or instead be colourless prior to laser writing. These features tend to make the composition best suited for application to filmic materials for use in packaging and labelling applications, and for security documents such as bank notes, ID cards, passports and the like.

The film of the invention is not intended for use as a photographic film.

By "laser writable" we mean that the laser writable component, or a substrate incorporating that component, undergoes a non-pyrolytic chemical or molecular identifiable change in at least one observable or measurable characteristic on exposure to laser radiation. The observable or measurable characteristic may be, or may include, the appearance of the component and/or the substrate in which it is incorporated, which may include the visible appearance (e.g. the colour) of the component and/or the substrate in which it is incorporated. The non-pyrolytic chemical or molecular change may be a chemical, stereochemical or oxidative change, but is not a pyrolytic change and is preferably not a decompositional or substantially decompositional change.

"Identifiable" means discernible by inspection, including visual inspection, or by other measurement or characterisation.

When the composition is incorporated into a substrate, such as a filmic substrate or coating therefor, the identifiable change on exposure to laser radiation effects a corresponding identifiable change in the substrate, but preferably without pyrolytically or decompositionally affecting the molecular structure of the substrate adjacent the component. In this sense at least the composition of the invention is distinguished from certain prior art disclosures which teach the creation of visual or other changes in substrates caused by subjecting those substrates or components thereof to laser radiation effective to change the appearance of the substrate by pyrolysis and/or decomposition of molecular components of the substrate. Thus for example a polymeric substrate incorporating carbon black or inorganic pigment particles in which laser bombardment of the particles causes the polymeric molecules adjacent such particles to heat up and change appearance as a result of pyrolytic or decompositional change are not "laser writable" in the sense in which that phrase is meant herein. When the composition is incorporated into substrate, the substrate becomes "laser writable" in the sense meant herein such that the substrate undergoes a non-pyrolytic chemical or molecular identifiable change in at least one observable or measurable characteristic on exposure to laser radiation, wherein preferably there is substantially no destruction of the molecular structure of the substrate during laser writing.

Other terms such as "laser printable", "laser imagable" and "laser markable" may be used more or less synonymously with "laser writable". However, "laser printable" in this connection does not mean printable by means of using a laser printer. Rather, "laser printable" means that a substrate incorporating the composition of the invention is printable in the sense that an identifiable change in the appearance of the substrate becomes apparent upon exposure of the composition within that substrate to laser radiation in the manner described above and with reference to the definition of "laser writable".

Thus from a second aspect the present invention provides a composition comprising a laser writable pigment wherein at least 50% of the laser writable pigment particles have a particle size of less than about 1 micrometer, and wherein the pigment undergoes a non-pyrolytic chemical or molecular identifiable change in at least one observable or measurable characteristic on exposure to laser radiation.

The laser writability of the pigment, of the composition comprising the pigment or of a substrate incorporating the composition may be such that a single identifiable change may be effected by laser writing, but in some cases more than one identifiable change may be effected.

Consequently, from a third aspect the present invention provides a composition comprising a laser writable pigment wherein at least 50% of the laser writable pigment particles have a particle size of less than about 1 micrometer, and wherein the pigment undergoes a first non-pyrolytic chemical or molecular identifiable change in at least one observable or measurable characteristic on exposure to a first laser radiation and wherein the pigment undergoes a second non-pyrolytic chemical or molecular identifiable change in at least one observable or measurable characteristic on exposure to a second laser radiation.

The first and second laser radiation may be the same or different in terms of their type, power, frequency and/or duration. For the avoidance of doubt in this connection the second laser radiation may for example simply comprise a prolongation of the first laser radiation, or it may emanate from an altogether different source.

A simple example of such a change would be a sequential colour change, for example from clear to blue on exposure to a first dose of laser radiation and from blue to red on a second dose of laser radiation.

It has previously been assumed that there is no advantage in using extremely low particle sizes; in fact, very low particle sizes have been avoided so as to avoid the need for extensive milling. Furthermore, the skilled person has generally not been motivated to reduce the particle size because for a given weight of material this results in a larger number of particles which can make processing more difficult, for example in terms of viscosity or in binding the material.

It has surprisingly now been found that improved optical properties can be obtained with lower particle sizes and that processability is still reasonable and manageable even with such particle sizes. Furthermore lower particle sizes result in more efficient lasing, i.e. less energy input is required in order to bring about effective laser writing/marking.

The particle sizes can be expressed in terms of their $d_{50}$ value, namely the maximum diameter of 50% of the particles. Preferred $d_{50}$ values include less than about 500 nanometers, 400 nanometers, 300 nanometers, 200 nanometers or 100 nanometers.

The small particle size of the present invention results in a high gloss, clear product, which has excellent optical properties across a broad gamut of colours.

Without wishing to be bound by theory, it may be the case that, for a fixed concentration, a reduction in particle size increases the surface area available for light absorption and reflection. Reducing the particle size seems to bring improvements in a non-linear manner, presumably because with approximately spherical particles the surface area increases in a non-linear manner.

Optionally other components present in the composition may also have small particle sizes as defined above.

According to the present invention the composition may be a coating composition.

Preferably the coating composition is for coating a polymeric film or a biopolymer film.

Alternatively the composition of the present invention may be a polymer film substrate or a biopolymer film substrate itself. In other words the laser writable pigment may be incorporated into the body of the substrate film, rather than being part of a coating composition applied to it.

In a further alternative, the composition of the present invention may be a layer on or in a polymer film or biopolymer film.

Preferably the composition of the present invention is used as a coating or skin layer on a polymer film or biopolymer film. For example the composition may be coated, coextruded or melt coated on the substrate.

The use of coatings or skin layers is particularly advantageous since this allows the laser writable pigment particles to be concentrated into particular thin surface layers thereby enhancing the efficacy with which laser writing can be carried out.

The compositions comprising the laser-sensitive pigments are encompassed within the present invention both in their "wet" form (i.e. a solution or suspension containing the pigment and other materials, for example a coating composition solution/suspension) and in their "dry" form (i.e. after removal of the water or other solvent, for example a dried coating).

From a further aspect the present invention provides a laser writable coating or layer on a polymeric film or biopolymer film, wherein the thickness of the layer or coating is less than 10 micrometers.

It has surprisingly been found that low thicknesses give excellent optical properties, particularly in terms of clarity and transparency. Both of these characteristics are important: high clarity means that images or indicia can be seen clearly, and high transparency means that light transmission is high. Furthermore, the coatings may be formed by processes (e.g. reverse gravure coating) which achieve thicknesses within a particular percentage variation, and a particular percentage variation of a thin coating is less than the same percentage variation of a thick coating; therefore there is greater uniformity and less colour variation. Another advantage is that thin coatings are less expensive than thick coatings.

Preferred thicknesses include less than 5 micrometers, less than 4 micrometers and less than 3 micrometers.

The thickness may be about 20 microns or less, or about 15 microns or less.

The coating may be applied to the film by any appropriate method as known in the art, for example by reverse gravure printing.

From a further aspect the present invention provides a composition (optionally a coating or layer in or on a polymer film) comprising a laser writable pigment in a concentration of 25 to 50% by weight of the total composition when dry.

It has been found that concentrations within this range bring about excellent optical properties. Preferred concentration ranges include 30 to 45% by weight and 35 to 40% by weight or the total composition when dry.

From a further aspect, the present invention provides a film comprising a laser writable composition (optionally as coating or layer in or on the film substrate) wherein the film has a gloss of greater than 70 gloss units (GU).

"Gloss" as referred to herein is surface or specular gloss being the ratio of the luminous flux reflected from, to that incident on, the sample being measured for specified solid angles at the specular direction i.e. the angles of incidence and reflection are equal. Gloss values referred to herein are gloss (45°) values, i.e. the angle used is 45°. The test method is described in ASTM D2457. The measurement of surface gloss of films may be made using a Novo gloss glossmeter with a rho point of 45°.

The high gloss products of the present invention are particularly advantageous in terms of appearance and applicability in a variety of products and application. High gloss products are aesthetically and commercially desirable. They result in high definition images, text and other visual characteristics rather than diffuse appearance. In some cases glossy materials are advantageous in giving a "no look" label for example in the beer and beverage industry.

Preferred gloss values include greater than 80% or greater than 85 gloss units, in some cases greater than 95 or higher.

One particular advantage of the present invention is that the coefficient of friction can be tuned.

From a further aspect the present invention provides a film comprising or carrying a laser writable composition (optionally as a coating or layer in or on the film) wherein the product has a coefficient of friction of between 0.2 and 2.

The present invention is suitable for use with products which can have a range of friction properties. The friction characteristics can be controlled or tuned independently with respect to the printed appearance because the laser writing/printing/marking in most cases does not affect the friction characteristics.

The coefficient of friction of the products of the present invention is particularly advantageous in downstream handling of the products. It can mean that the products can be processed and handled well and stacked and unstacked in a convenient manner.

In some applications (for example in some packaging such as that used for wrapping (e.g. twist wrap), high friction is required so that the product can stick to itself or be held against itself easily. In other applications (for example where high speed processing through apparatus is the main factor) low friction is desirable. In yet other applications (for example where product needs to be produced relatively quickly but where stacking is required) a balance is desirable. In one example the high speed packing of reams of paper requires appropriate friction characteristics. In another example the use of reels means that the friction characteristics of the wound product must be high enough to avoid problems such as telescoping. A further consideration is that the material should not have such high friction characteristics so as to result in static problems.

The coefficient of friction referred to herein is preferably the dynamic coefficient of friction. Suitable coefficient of friction values can include about 0.4 to 0.9, 0.2 to 0.6, 0.2 to 1, 0.2 to 0.4 or 0.3 to 0.5, for example, depending on the application.

The coefficient of friction values referred to herein are preferably in respect of the product to itself.

From a further aspect the present invention provides a film comprising or carrying a laser writable composition (optionally as a coating or layer in or on the film) wherein the product has a clarity of greater than 95%.

Preferred clarity values include greater than 96%, preferably greater than 97%.

From a further aspect of the present invention provides a film comprising or carrying a laser writable composition (optionally as a coating or layer in or on the film) wherein the product has a haze of less than 15%.

Preferred haze values include less than 5%, or less than 3%.

Haze referred to herein is the wide angle haze (WAH) of a film—the percentage of transmitted light which is passed through the film which deviates from the incident beam by more than 2.5 degrees of forward scattering. Measurements of WAH of films may be made using an E.EL Spherical Haze Meter. The test method is described in ASTM D1003.

Additionally or alternatively, product may have a narrow angle haze value of about 3.0% or lower, about 2.5% or lower, about 2.0% or lower, about 1.5% or lower, or about 1% or lower.

The narrow angle haze (NAH) of a film is the amount of parallel light which is scattered by more than 6 minutes) (0.1° of arc when passing through the film sample from the incident beam. NAH is measured as a percentage of the total light transmitted through the film. The measurement of NAH of films may be made using laser narrow angle haze machines.

Thus the high clarity values referred to herein are the converse of the low narrow angle scattering values. High clarity correlates to see-through quality, i.e. how well fine details can be seen through the specimen.

From a further aspect the present invention provides a film which is both laser writable/printable/markable and ink printable. This may be by virtue of the properties of a coating or layer in or on the film or of properties of the film bulk substrate itself.

Considerable further flexibility, functionality and advantages can be provided when laser writability and conventional printability are combined. By "ink printable" is meant any conventional or known printing technique including for example water based, solvent based or UV based technologies, and including for example flexographic (flexo), gravure, screen printing and rotary screen printing methods. UV flexo is preferred.

The substrates of the present invention are suitable for a wide variety of printing processes. For example label face stock—optionally for pressure sensitive adhesive labels—can be used for both conventional printing options and also laser writing.

One example of why the combination of laser writing and conventional printing is useful is as follows. In some industries, for example in fast moving consumer goods (FMCG) industries, large quantities of the same or similar product, packaging or label are used. Most of the information is the same on each item (e.g. the brand, the bulk of the design, various information, etc.) and therefore is suitably imparted by conventional printing methods which are cost-effective for large print runs (for example UV Flexo). Often, a smaller amount of additional information is useful on smaller batches, e.g. to provide country- or market-specific tailoring, to promote special offers, to provide indications as to when the item was made or filled or when it should be consumed or used by (e.g. "best before" or "use by" dates), or for any other purpose where tailoring or modification of the visual appearance or indicia is desired. Laser writing/marking/printing is ideally suited to such uses with respect to smaller runs or even individual items, whereas conventional printing is not cost-effective with such small scale or low volume work. In other words, laser writing/printing/marking and conventional printing can be used in combination such that each is used cost-effectively.

Various characteristics are referred to herein and the skilled person will understand at which stage in the process the characteristics are important. For example, desired gloss, clarity, haze and other optical properties such as a broad colour gamut are important in the final product, but optionally may also be desirable after partial printing in the event that the product may be used or is intended to be used after such partial printing. The friction characteristics are optionally important at the stage at which the product is handled or processed or may be processed downstream. In the case of films and other substrates the properties may optionally be applicable to the product including the film, not just the laser-writable coating or skin layer.

The laser writable pigment may be any known laser writable pigment, including those disclosed in the prior art summarised above. The invention works particularly well with laser writable organic pigments, for example those with sp or sp2 hybridized carbon atoms, for example those with ethylenic or acetylenic unsaturation. Diacetylene based pigments, for example such as those disclosed in the prior art documents summarised above may be particularly mentioned. A wide range of such pigments is available including full colour laser writable pigments. For example, the laser writable diacetylene-based pigments may be selected from those disclosed in any of WO 2009/093028, WO 2009/081385, WO 2012/114121, WO 2010/001171, WO 2010/112940, WO 2006/018640, WO 2010/089595 and WO 2011/121265.

As known in the art, the diacetylene-containing materials may be functionalised into amide form. The diacetylene-containing compound may be based on 10,12-docosadiyn-dioic acid, for example an amide derivative thereof, e.g. 10,12-docosadiyn-bis-propargylamide, as disclosed in WO 2010/112940.

The laser markable pigment may be a material which allows a change from colourless to monochrome (e.g. clear to black) or degrees thereof. For example the colour changer may be Pergascript Black 1C (BASF) or a related product.

By laser writable pigment, or laser markable/printable/imagable pigment, can be meant any of the compounds known which can undergo a change in appearance on laser irradiation. The change in appearance may be for example a change from invisible to visible appearance, a change from one visible appearance to another visible appearance, a colour change, a change in extent or hue of colour, a monochrome change, or any combination of these.

In accordance with the present invention, optionally the irradiation does not need to be laser irradiation. For example, as is known in the art, other sources of energy including other lamp, diode and other emission arrangements are possible. Nevertheless, where accurate, sharp or focussed printing is required, laser radiation is preferred.

In accordance with the present invention, the change of appearance may be brought about by various forms of energy, such as IR, visible or UV radiation. For example, as is known in the art, UV radiation may bring about one change, heat may bring about a different change, and infrared or near-infrared radiation may bring about a different change. Many of the known compositions are appropriate for use with, and are indeed designed for use with, a sequence of energy exposure, particularly if a range of colours or appearances is required. For example, diacetylenes are well known to undergo a sequence of changes, e.g. an initial change on exposure to UV energy, and subsequent changes when heated, so that they can be used to produce various colours. These properties originate from the chemical structure and reactivities of the diacetylenes including their ability to polymerize, and are known to the skilled person. In accordance with the present invention the skilled person will understand that diacetylene compounds are not essential but that other laser writable pigments which undergo one or more changes as known in the art may alternatively or additionally be used.

More than one laser writable pigment may be used, or a combination of laser writable pigment(s) and other pigments or colour/appearance change agents may be used.

Optionally, additives may be used in the present invention in order to enhance the efficacy of the process, as known in the art.

For example, energy absorbers such as e.g. infrared or near infra red (NIR) absorbers can be incorporated to enhance the process. Suitable IR absorbers include indium tin oxide (ITO) for example or other ingredients known for this purpose, as for example disclosed in the prior art described above.

Preferably the composition includes a diacetylene and an NIR absorber.

Alternatively the energy absorber may be SABoTBA (Tri-n-butylammoniumborodisalicylate). Optionally this may be used in combination with the pigment changer Pergascript Black 1C.

A further advantage of the present invention is that it is possible to bring about a large colour gamut thereby enhancing the optical properties of the film. Previously it has not been possible to obtain such a good surface finish together with the colour gamut and optionally the downstream surface characteristics desired.

Other optional components may be present in the composition as required, including conventional additives and components known in the art.

For example, components of coating compositions including binders and other ingredients are well known in the art.

In a further aspect the present invention comprises a product where the film is one component part.

From a further aspect the present invention provides a label, for example a pressure sensitive adhesive label, comprising the film of the present invention.

From a further aspect the present invention provides a packaged product wherein the film of the invention is used in the packaging.

The use of the film in a packaging context may, for example, include its use as a container, sleeve, lid, label or wrapper. The film may be used on its own or may be combined with other materials, for example as part of a laminated structure.

The films used in the present invention, prior to deposition of any coating and/or skin or lamination layer may comprise any suitable polymeric filmic substrate, such as films made from biopolymers [e.g. polylactic and/or cellulosic films (e.g. microbial and/or regenerated cellulose film)]; thermoplastic films; polymeric films (for example films comprising: polyolefins [e.g. polypropylene and/or polyethylene] polyurethanes, polyvinylhalides [e.g. PVC], polyesters [e.g. polyethylene terephthalate-PET], polyamides [e.g. nylons] and/or non-hydrocarbon polymers); and/or multilayer and/or composite sheets formed by any suitable combinations and/or mixtures of thereof. Suitable filmic substrates therefore include polyolefinic films, but also polyester films, polyurethane films, cellulosic and PLA films.

The film may therefore comprise a cellulosic material, polymeric material and/or thermoplastic polymer, and may conveniently comprise polymers of low surface energy. More preferably the sheet comprises a homopolymer, a crystalline polymer and/or a polymer of randomly oriented amorphous non-crystalline polymer chains. Most preferably the sheet comprises: polyolefins [e.g. polypropylene and/or polyethylene]polyurethanes, polyvinylhalides [e.g. polyvinyl chloride (PVC)], polyesters [e.g. polyethylene terephthalate-PET], polyamides [e.g. nylons] and/or non-hydrocarbon polymers).

Conveniently the polyolefin films to be used with the present invention may comprise one or more polyolefins [e.g. polypropylene homopolymer, polyethylene homopolymer (e.g. linear low-density polyethylene-LLDPE) and/or polypropylene/polyethylene copolymer(s); optionally in one or more layers]. The constituent polymers and/or layers in a film of the present invention may be oriented, blown, shrunk, stretched, cast, extruded, co-extruded and/or comprise any suitable mixtures and/or combinations thereof.

Preferred films comprise a major proportion of polypropylene and/or an olefin block copolymer containing up to about 15% w/w of the copolymer of at least one copolymerisable olefin (such as ethylene). More preferred films comprise polypropylene homopolymer, most preferably isotactic polypropylene homopolymer.

Films may optionally be cross-linked by any suitable means such as electron beam (EB) or UV cross-linking, if necessary by use of suitable additives in the film.

The definition of polyolefin, as intended herein, is a polymer assembled from a significant percentage, preferably ≥50% by weight of one or more olefinic monomers.

The definition of copolymer herein is a polymer assembled from two or more monomers. Such polymers may include, but are not limited to, polyethylene homopolymers, ethylene-α-olefin copolymers, polypropylene-α-olefin copolymers, polypropylene homopolymers, ethylene-vinyl acetate copolymers, ethylene-methacrylic acid copolymers and their salts, ethylene-styrene polymers and/or blends of such polymers. The polymers may be produced by any suitable means, for example one or more of free radical polymerisation (e.g. peroxy compounds), metallocene catalysis and/or coordination catalysis (e.g. Ziegler and/or Natta catalysts and/or any variations thereof).

Polymeric resins used to produce the films of the present invention are generally commercially available in pellet form and may be melt blended or mechanically mixed by well-known methods known in the art, using commercially available equipment including tumblers, mixers and/or blenders. The resins may have other additional resins blended therewith along with well-known additives such as processing aids and/or colorants. Methods for producing polyolefin films are well-known and include the techniques of casting films as thin sheets through narrow slit dies, and blown-film techniques wherein an extruded tube of molten polymer is inflated to the desired bubble diameter and/or film thickness.

For example to produce a polymeric film the resins and additives may be introduced into an extruder where the resins are melt plastified by heating and then transferred to an extrusion die for formation into a film tube. Extrusion and die temperatures will generally depend upon the particular resin being processed and suitable temperature ranges are generally known in the art or provided in technical bulletins made available by resin manufacturers. Processing temperatures may vary depending upon process parameters chosen.

Thus, the polymeric film can be made by any process known in the art, including, but not limited to, cast sheet, cast film, or blown film. This invention may be particularly applicable to films comprising cavitated or non-cavitated polypropylene films, with a block copolymer polypropylene/polyethylene core and skin layers with a thickness substantially below that of the core layer and formed for example from random co-polymers of ethylene and propylene or random terpolymers of propylene, ethylene and butylene. The film may comprise a biaxially orientated polypropylene (BOPP) film, which may be prepared as balanced films using substantially equal machine direction and transverse direction stretch ratios, or can be unbalanced, where the film is significantly more orientated in one direction (MD or TD). Sequential stretching can be used, in which heated rollers effect stretching of the film in the machine direction and a stenter oven is thereafter used to effect stretching in the transverse direction. Alternatively, simultaneous stretching, for example, using the so-called bubble process, or simultaneous draw stenter stretching may be used.

A film of the present invention may be oriented by stretching at a temperature above the glass transition temperature (Tg) of its constituent polymer(s). The resultant oriented film may exhibit greatly improved tensile and stiffness properties.

Conveniently a film comprising a propylene homopolymer is oriented at a temperature within a range of from about 145° C. to 165° C. Orientation may be along one axis if the film is stretched in only one direction, or may be biaxial if the film is stretched in each of two mutually perpendicular directions in the plane of the film. A biaxial oriented film may be balanced or unbalanced, where an unbalanced film has a higher degree of orientation in a preferred direction, usually the transverse direction. Conventionally the longitudinal direction (LD) is the direction in which the film passes through the machine (also known as the machine direction or MD) and the transverse direction (TD) is perpendicular to MD. Preferred films are oriented in both MD and TD. Orientation of the film may be achieved by any suitable technique. For example in the bubble process the polypropylene film is extruded in the form of a composite tube which is subsequently quenched, reheated, and then expanded by internal gas pressure to orient in the TD, and withdrawn, at a rate greater than that at which it is extruded, to stretch and orient it in the MD. Alternatively a flat film may be oriented by simultaneous or sequential stretching in each of two mutually perpendicular directions by means of a stenter, or by a combination of draw rolls and a stenter. A preferred oriented film comprises biaxially oriented polypropylene (known herein as BOPP), more preferably the BOPP film described in EP 0202812.

The degree to which the film substrate is stretched depends to some extent on the ultimate use for which the film is intended, but for a polypropylene film satisfactory tensile and other properties are generally developed when the film is stretched to between three and ten, preferably, seven or eight, times its original dimensions in each of TD and MD.

After stretching, the polymeric film substrate is normally heat-set, while restrained against shrinkage or even maintained at constant dimensions, at a temperature above the Tg of the polymer and below its melting point. The optimum heat-setting temperature can readily be established by simple experimentation. Conveniently a polypropylene film is heat-set at temperatures in the range from about 100° C. to about 160° C. Heat-setting may be effected by conventional techniques for example by means one or more of the following: a stenter system; one or more heated rollers (e.g. as described in GB 1124886) and/or a constrained heat treatment (e.g. as described in EP 023776).

The film may comprise a major proportion of polypropylene such as isotactic polypropylene homopolymer, but also may comprise coextruded multilayer films where the polymer of at least one layer is isotactic polypropylene homopolymer, and the polymer of one or both outer layers is a surface layer polymer having different properties to the isotactic polypropylene homopolymer.

The sheet of the present invention may consist of only one layer, or the sheet may be multi-layered i.e. comprise a plurality of layers. The layers can be combined by lamination or co-extrusion. Preferably the sheet comprises at least three layers where at least one layer(s) are sandwiched between other layers such that none of such sandwiched layer(s) form either surface of the sheet.

A film of the invention may also be made by lamination of two coextruded films.

One or more layers of the film may be opaque or transparent depending on the end use of the film. Such layers may also comprise voids introduced by stretch orienting such a layer containing spherical particles of a material higher melting than and immiscible with the layer material (e.g. if the layer comprises isotactic polypropylene homopolymer, then such particles may be, polybutylene terephthalate, as shown, for example, in U.S. Pat. No. 4,632,869 and U.S. Pat. No. 4,720,716). Preferably though the film is transparent, making it most suitable for packaging and labelling applications, and for security documents such as bank notes, ID cards, passports and the like.

Multiple-layer films of the invention may be prepared in a range of thicknesses governed primarily by the ultimate application for which a particular film is to be employed. For general use films, having a mean thickness from about 10 μm to about 500 μm, preferably from about 15 μm to about 400 μm are suitable. For certain applications, such as packaging, preferred films have a mean thickness of from about 25 μm to 360 μm, most preferably from about 50 μm to about 350 μm.

If desired, before coating a sheet of the present invention (e.g. with a laser writable coating of the present invention and/or any other coating and/or layer) it may be subjected to a chemical or physical surface-modifying treatment to ensure that the coating and/or layer will better adhere to the sheet thereby reducing the possibility of the coating peeling or being stripped from the sheet. Known prior art techniques for surface pre-treatment prior to coating comprise, for example: film chlorination, i.e., exposure of the film to gaseous chlorine; treatment with oxidising agents such as chromic acid, hot air or steam treatment; flame treatment and the like. A preferred treatment, because of its simplicity and effectiveness, is the so-called electronic treatment in which the sheet is passed between a pair of spaced electrodes to expose the sheet surface to a high voltage electrical stress accompanied by corona discharge.

Optionally if even adhesion of the coating is desired an intermediate continuous coating of a primer medium and/or anchor coating can be applied to a sheet surface treated by any of the methods described herein. Primer materials may comprise titanates and poly(ethylene imine) and may be applied as conventional solution coatings [such as poly (ethylene imine) applied as either an aqueous or organic solvent solution, e.g. in ethanol comprising about 0.5 wt. % of the imine]. Another primer medium comprises the interpolymerised condensation acrylic resins prepared in the presence of a $C_{1-6}$alkanol as described in either: GB 1134876 (condensing aminoaldehyde with an interpolymer of acrylamide or methacrylamide with at least one other unsaturated monomer); or in GB 1174328 (condensing aminoaldehyde with acrylamide or methacrylamide, and subsequently interpolymerising the condensation product with at least one other unsaturated monomer).

The film may comprise one or more additive materials. Additives may comprise: dyes; pigments, colorants; metallised and/or pseudo metallised coatings (e.g. aluminium); lubricants, anti-oxidants, surface-active agents, stiffening aids, gloss-improvers, prodegradants, UV attenuating materials (e.g. UV light stabilisers); sealability additives; tackifiers, anti-blocking agents, additives to improve ink adhesion and/or printability, cross-linking agents (such as melamine formaldehyde resin); adhesive layer (e.g. a pressure sensitive adhesive); and/or an adhesive release layer (e.g. for use as the backing material in the peel plate method for making labels).

Further additives comprise those to reduce coefficient of friction (COF) such as a terpolymer described in U.S. Pat. No. 3,753,769 which comprises from about 2% to about 15% w/w of acrylic or methacrylic acid, from about 10% to about 80% w/w of methyl or ethyl acrylate, and from about 10% to about 80% w/w of methyl methacrylate, together with colloidal silica and carnauba wax.

Still further additives comprise slip aids such as hot slip aids or cold slip aids which improve the ability of a film to satisfactorily slide across surfaces at about room temperature for example micro-crystalline wax. Preferably the wax is present in the coating in an amount from about 0.5% to about 5.0% w/w, more preferably from about 1.5% to about 2.5% w/w. The wax particles may have an average size conveniently from about 0.1 µm to 0.6 µm, more conveniently from about 0.12 µm to about 0.30 µm.

Yet further additives comprise conventional inert particulate additives, preferably having an average particle size of from about 0.2 µm to about 4.5 µm, more preferably from about 0.7 µm to about 3.0 p.m. The amount of additive, preferably spherical, incorporated into the or each layer is desirably in excess of about 0.05%, preferably from about 0.1% to about 0.5%, for example, about 0.15%, by weight. Suitable inert particulate additives may comprise an inorganic or an organic additive, or a mixture of two or more such additives.

Suitable particulate inorganic additives include inorganic fillers such as talc, and particularly metal or metalloid oxides, such as alumina and silica. Solid glass or ceramic micro-beads or micro-spheres may also be employed. A suitable organic additive comprises particles, preferably spherical, of an acrylic and/or methacrylic resin comprising a polymer or copolymer of acrylic acid and/or methacrylic acid. Such resins may be cross-linked, for example by the inclusion therein of a cross-linking agent, such as a methylated melamine formaldehyde resin. Promotion of cross-linking may be assisted by the provision of appropriate functional groupings, such as hydroxy, carboxy and amido groupings, in the acrylic and/or methacrylic polymer.

Yet still further additives comprise fumed silica for the purpose of further reducing the tack of a coating at room temperature. The fumed silica is composed of particles which are agglomerations of smaller particles and which have an average particle size of, for example, from about 2 µm to about 9 µm, preferably from about 3 µm to about 5 and is present in a coating in an amount, for example, from about 0.1% to about 2.0% by weight, preferably about 0.2% to about 0.4% by weight.

Some or all of the desired additives listed above may be added together as a composition to coat the sheet of the present invention and/or form a new layer which may itself be coated (i.e. form one of the inner layers of a final multi-layered sheet) and/or may form the outer or surface layer of the sheet. Alternatively some or all of the preceding additives may be added separately and/or incorporated directly into the bulk of the sheet optionally during and/or prior to the sheet formation (e.g. incorporated as part of the original polymer composition by any suitable means for example compounding, blending and/or injection) and thus may or may not form layers or coatings as such. These conventional other coatings and/or layers may thus be provided on top of or underneath the laser writable coatings of the present invention and may be in direct contact thereto or be separated by one or more other intermediate layers and/or coats.

Such additives may be added to the polymer resin before the film is made, or may be applied to the made film as a coating or other layer. If the additive is added to the resin, the mixing of the additives into the resin is done by mixing it into molten polymer by commonly used techniques such as roll-milling, mixing in a Banbury type mixer, or mixing in an extruder barrel and the like. The mixing time can be shortened by mixing the additives with unheated polymer particles so as to achieve substantially even distribution of the agent in the mass of polymer, thereby reducing the amount of time needed for intensive mixing at molten temperature. The most preferred method is to compound the additives with resin in a twin-screw extruder to form concentrates which are then blended with the resins of the film structure immediately prior to extrusion.

Formation of a film of the invention (optionally oriented and optionally heat-set as described herein) which comprises one or more additional layers and/or coatings is conveniently effected by any of the laminating or coating techniques well known to those skilled in the art.

For example a layer or coating can be applied to another base layer by a coextrusion technique in which the polymeric components of each of the layers are coextruded into intimate contact while each is still molten. Preferably, the coextrusion is effected from a multi-channel annular die such that the molten polymeric components constituting the respective individual layers of the multi-layer film merge at their boundaries within the die to form a single composite structure which is then extruded from a common die orifice in the form of a tubular extrudate.

A film of the invention may also be coated with one or more of the additives described herein using conventional coating techniques from a solution or dispersion of the additive in a suitable solvent or dispersant. An aqueous latex, (for example prepared by polymerising polymer precursors of a polymeric additive) in an aqueous emulsion in the presence of an appropriate emulsifying agent is a preferred medium from which a polymeric additive or coating may be applied.

Coatings and/or layers may be applied to either or both surfaces of the sheet. The or each coating and/or layer may be applied sequentially, simultaneously and/or subsequently to any or all other coatings and/or layers. If a laser writable coating of the present invention is applied to only one side of the sheet (which is preferred) other coatings and/or layers may be applied either to the same side of the sheet and/or on the reverse (other) side of the sheet.

A coating composition may be applied to the treated surface of sheet (such as the polymer film) in any suitable manner such as by gravure printing, roll coating, rod coating, dipping, spraying and/or using a coating bar. Solvents, diluents and adjuvants may also be used in these processes as desired. The excess liquid (e.g. aqueous solution) can be removed by any suitable means such as squeeze rolls, doctor knives and/or air knives. The coating composition will ordinarily be applied in such an amount that there will be deposited following drying, a smooth, evenly distributed layer having a thickness of from about 0.02 to about 10 µm, preferably from about 1 to about 5 µm. In general, the thickness of the applied coating is such that it is sufficient to impart the desired characteristics to the substrate sheet. Once applied to the sheet a coating may be subsequently dried by hot air, radiant heat or by any other suitable means to provide a sheet of the present invention with the properties desired (such as an optionally clear; optionally substantially water insoluble; highly oxygen impermeable coated film useful, for example in the fields of authentication, packaging, labelling and/or graphic art).

It would also be possible to use combinations of more than one of the above methods of applying additives and/or components thereof to a film. For example one or more additives may be incorporated into the resin prior to making the film and the one or more other additives may be coated onto the film surface.

In a multi-layer film in accordance with the invention having at least a substrate layer and a skin layer, the skin layer may be preferably ink printable. The skin layer has a thickness of from about 0.05 μm to about 2 μm, preferably from about 0.1 μm to about 1.5 μm, more preferably from about 0.2 μm to about 1.25 μm, most preferably from about 0.3 μm to about 0.9 μm.

The present invention can be used to make various different kinds of films including clear, white and cavitated films. Clear films are preferred, as mentioned herein.

From a further aspect the present invention provides a method of manufacturing a laser writable film comprising: incorporating within the film or a skin layer thereof, or coating the film with a coating comprising, a laser writable pigment and optionally other components such as for example an energy absorber as referred to herein.

From a yet further aspect the present invention provides the use of a laser writable film of the present invention for providing an image, information or other visual characteristic(s) on an item, for example in packaging or labeling.

From a yet further aspect the present invention provides apparatus for preparing or processing the laser writable composition of the present invention.

It will be appreciated that the invention has been described herein in terms of various features, for example particle size, thickness, concentration, gloss, friction, clarity, haze, combination printing, type of laser-markable compound, type of energy absorber, type of composition (e.g. coating, skin layer or bulk substrate), method of preparation, nature of application, type of use and multicomponent possibilities, amongst others. Each of the features described herein is where appropriate generally applicable and combinable with other feature(s) described herein. Thus for example the low particle size feature may be combined with any other feature(s) e.g. the combination printing feature. In another example the high gloss feature may be combined with any other feature. These are non-limiting examples of suitable combinations and the skilled person will understand that any other appropriate combinations are envisaged.

EXAMPLES

Coating compositions comprising diacetylide laser-writable pigments (10,12-docosadiyn-bis-propargylamide) were prepared. C50 polypropylene film samples available from Innovia Films Limited, Wigton, UK, were coated with the coating compositions' using a Meyer bar or K-bar. The coated products were irradiated.

As described below, the particle size of the laser-writable pigment, the concentration of the laser-writable pigment and the thickness of the coating were each varied, and the effects on each of gloss, haze, clarity, transmission, static coefficient of friction, dynamic coefficient of friction, and L a b values were observed.

Methodology for Analyzing the Effect of the Variables on the Characteristics of the Product A central composite design was used to show the effect of the three variables (particle size of the laser-writable pigment, concentration of the laser-writable pigment and thickness of the coating) on specific responses (gloss, haze, clarity, transmission, static coefficient of friction, dynamic coefficient of friction, and L a b values). It was also used to optimise the variables for colour gamut and optical properties.

Central composite designs pertain to the estimation (fitting) of response surfaces, following the general model equation:

$$y = b_0 + b_1 * x_1 + \ldots + b_k * x_k + b_{12} * x_1 * x_2 + b_{13} * x_1 * x_3 + \ldots + b_{k-1,k} * x_{k-1} * x_k + b_{11} * x_1^2 + \ldots + b_{kk} * x_k^2$$

thereby fitting a model to the observed values of the dependent variable y, that include
(1) main effects for factors $x_1, \ldots, x_k$,
(2) their interactions ($x_1 * x_2, x_1 * x_3, \ldots, x_{k-1} * x_k$), and
(3) their quadratic components ($x_1 2, x_k 2$).

In these experiments a rotatable design was used. Each factor (particle size, concentration and coating thickness) is independent, which is a prerequisite for orthogonality and rotatability.

Coating Formulation

The basic formulation of the coating was made in three steps:

1. A premix or grind was made and then ground to a $D_{95}$ of 40 microns,
2. The premix was then ground again so that the $D_{50}$ was the desired size for the experimental design.
3. The let-down stage controlled the concentration of the pigment in the coating, as per the experimental design.

Particle size was measured using a Coulter Counter.

Premix to Produce Mill Base

| Raw Material | % by weight | % dry weight | Generic name | Supplier, Comments |
|---|---|---|---|---|
| Water | 19.66 | | | |
| Joncryl LMV 7085 | 37.42 | 23.36 | Dilutable Acrylic (34.96% in water) | BASF |
| Dispelair CF49 | 0.24 | 0.43 | Wetting agent | Blackburn Chemicals Ltd, Blackburn, UK |
| Dispex A40 | 0.42 | 0.75 | Anti foam | BASF |
| r-ITO | 6.04 | 10.78 | Indium tin oxide (used as an IR absorber - gives out heat on exposure to IR) | Evonic |
| 10,12-docosadiyn-bis-propargylamide | 36.22 | 64.88 | Di-acetylide pigment | |

The mill base produced from the above-mentioned premix was then mixed with further ingredients in a let down stage. Five different compositions were prepared, with varying concentrations of mill base as shown in the table below.

Let Down

| | Generic name | Supplier, Comments | % dry weight | % dry weight | % dry weight | % dry weight | % dry weight |
|---|---|---|---|---|---|---|---|
| Water Mill base (i.e. the product of the premix) | Water Mill Base | | 70.000 | 60.000 | 50.000 | 43.18 | 76.82 |

Table 1 (continued from previous page)

| | Generic name | Supplier, Comments | % dry weight | % dry weight | % dry weight | % dry weight | % dry weight |
|---|---|---|---|---|---|---|---|
| Tinuvin 1130 | UV stabiliser | BASF | 0.790 | 1.053 | 1.317 | 1.496 | 0.610 |
| Tinuvin 292 | UV absorber | BASF | 0.520 | 0.693 | 0.867 | 0.985 | 0.402 |
| CX100 | Aziridine | DSM NeoResins, Waalwijk | 0.150 | 0.200 | 0.250 | 0.284 | 0.116 |
| Joncryl 8052 | Acrylic emulsion | BASF | 28.540 | 38.053 | 47.567 | 54.053 | 22.054 |

Experimental Design

TABLE 1

| Sample | Size/nm | Concentration (% by weight) of the mill base in the let down | Concentration (% dry weight) of the pigment in the dry coating | Thickness (coded units) | Actual thickness microns (dry) |
|---|---|---|---|---|---|
| 1 | 177 | 50.00 | 32.4 | 3.00 | 4 |
| 2 | 413 | 50.00 | 32.4 | 3.00 | 4 |
| 3 | 177 | 70.00 | 45.4 | 3.00 | 4.03 |
| 4 | 413 | 70.00 | 45.4 | 3.00 | 4.04 |
| 5 | 177 | 50.00 | 32.4 | 5.00 | 13 |
| 6 | 413 | 50.00 | 32.4 | 5.00 | 13 |
| 7 | 177 | 70.00 | 45.4 | 5.00 | 13.02 |
| 8 | 413 | 70.00 | 45.4 | 5.00 | 13.04 |
| 9 | 96 | 60.00 | 38.9 | 4.00 | 7.7 |
| 10 | 494 | 60.00 | 38.9 | 4.00 | 7.7 |
| 11 | 295 | 43.18 | 28.0 | 4.00 | 7.7 |
| 12 | 295 | 76.82 | 49.8 | 4.00 | 7.79 |
| 13 | 295 | 60.00 | 38.9 | 2.32 | 2.55 |
| 14 | 295 | 60.00 | 38.9 | 5.68 | 16.8 |
| 15 | 295 | 60.00 | 38.9 | 4.00 | 7.7 |
| 16 | 295 | 60.00 | 38.9 | 4.00 | 7.7 |
| 17 | 295 | 60.00 | 38.9 | 4.00 | 7.7 |
| 18 | 295 | 60.00 | 38.9 | 4.00 | 7.69 |
| 19 | 295 | 60.00 | 38.9 | 4.00 | 7.69 |
| 20 | 295 | 60.00 | 38.9 | 4.00 | 7.69 |

Results were Measured in Respect of:

Gloss, Haze, Clarity, Transmission, Coefficient of friction (static and dynamic), and l a b values for both the red colouration and the blue colouration both in transmission (trans) and in reflectance(ref).

The CIE L*a*b* or CIELAB colour scale system was used. The colour space is device independent. A HunterLab colour measurement instrument may be used. L a b values relate to the lightness/darkness of the colour (1 value) the red green hue (a value) and the blue yellow hue (b value). −100 to +100 on both a or b values will give the full colour range and 0 to 100 on the 1 value will give all chroma options. The results are shown in Table 2.

TABLE 2

| Sample | Gloss | Transmission | Haze | Clarity | COF Sta | COF Dyn | red trans l | red trans a | red trans b | blue trans l | blue trans a | blue trans b |
|---|---|---|---|---|---|---|---|---|---|---|---|---|
| 1 | 82.73 | 93.3 | 7.56 | 97.6 | 1.0110 | 0.6448 | 82.95 | 27.58 | −3.98 | 83.31 | −8.02 | −15.03 |
| 2 | 81.67 | 93.8 | 6.12 | 97.4 | 0.5082 | 0.5222 | 83.98 | 24.76 | −3.99 | 84.35 | −7.83 | −14.30 |
| 3 | 83.50 | 92.9 | 8.32 | 97.4 | 0.5936 | 0.5647 | 81.13 | 26.29 | −4.23 | 79.61 | −9.22 | −18.62 |
| 4 | 79.30 | 93.2 | 7.86 | 97.6 | 0.5128 | 0.485 | 79.35 | 32.79 | −3.34 | 73.02 | −9.89 | −26.32 |
| 5 | 86.23 | 88.3 | 18.5 | 97.2 | 0.6492 | 0.6196 | 67.55 | 53.25 | −2.62 | 67.41 | −13.35 | −29.66 |
| 6 | 74.93 | 89.8 | 13.4 | 97.2 | 0.5736 | 0.5508 | 69.78 | 51.24 | −3.47 | 71.40 | −13.24 | −26.07 |
| 7 | 73.60 | 87.2 | 20.8 | 97.2 | 0.5512 | 0.5547 | 62.82 | 56.43 | 0.53 | 64.08 | −12.16 | −31.00 |
| 8 | 78.63 | 89.2 | 12.9 | 97.2 | 0.5605 | 0.5281 | 62.18 | 57.85 | 0.79 | 62.19 | −11.74 | −33.12 |
| 9 | 87.27 | 89.2 | 7.86 | 97.1 | 0.6686 | 0.6261 | 68.98 | 51.95 | −2.31 | 69.39 | −13.23 | −27.38 |
| 10 | 73.93 | 90.6 | 13.8 | 97.3 | 0.5683 | 0.5393 | 68.02 | 53.47 | −3.57 | 68.94 | −13.27 | −28.71 |
| 11 | 81.33 | 90.4 | 11 | 97.5 | 1.0140 | 0.8104 | 72.28 | 48.49 | −4.74 | 72.32 | −13.14 | −26.04 |
| 12 | 78.07 | 89.2 | 11.7 | 97.4 | 0.6925 | 0.5758 | 64.32 | 54.57 | −0.81 | 60.01 | −10.10 | −35.16 |
| 13 | 82.53 | 93.6 | 6.13 | 97.7 | 0.6551 | 0.6276 | 89.16 | 5.57 | −3.68 | 92.98 | −1.45 | −2.77 |
| 14 | 72.43 | 85.5 | 20.9 | 97.5 | 0.5813 | 0.5704 | 65.80 | 54.91 | −1.03 | 67.49 | −13.12 | −28.93 |
| 15 | 78.23 | 89.5 | 11.7 | 97.4 | 0.7274 | 0.6445 | 66.25 | 56.62 | −2.19 | 67.73 | −12.85 | −29.26 |
| 16 | 78.97 | 90 | 10.9 | 97.2 | 0.8390 | 0.7894 | 69.54 | 51.05 | −3.86 | 69.16 | −13.05 | −27.92 |
| 17 | 79.90 | 89.2 | 12.8 | 97.6 | 0.7657 | 0.7429 | 69.05 | 51.84 | −2.95 | 69.51 | −13.00 | −27.46 |
| 18 | 78.47 | 88.9 | 11.6 | 97.5 | 0.8034 | 0.7384 | 68.33 | 52.70 | −3.55 | 69.20 | −13.13 | −28.33 |
| 19 | 78.52 | 90 | 10.9 | 97.4 | 0.5943 | 0.6632 | 68.96 | 52.83 | −3.82 | 68.80 | −13.23 | −28.39 |
| 20 | 78.50 | 89.7 | 12.2 | 97.2 | 0.6247 | 0.6044 | 67.57 | 52.82 | −3.88 | 61.73 | −12.98 | −35.90 |

| Sample | red ref l | red ref a | red ref b | blue ref l | blue ref a | blue ref b |
|---|---|---|---|---|---|---|
| 1 | 27.59 | 10.80 | −1.47 | 21.88 | −2.36 | −10.97 |
| 2 | 25.72 | 10.11 | −0.17 | 22.39 | −2.11 | −9.76 |
| 3 | 24.20 | 11.35 | −0.90 | 21.18 | −2.07 | −12.11 |
| 4 | 23.45 | 13.46 | 0.39 | 19.26 | −1.02 | −12.89 |
| 5 | 25.99 | 18.31 | 5.86 | 20.50 | 2.21 | −16.48 |
| 6 | 24.49 | 17.07 | 4.52 | 20.43 | 1.04 | −15.13 |
| 7 | 28.50 | 17.99 | 8.68 | 23.48 | 3.50 | −15.45 |

TABLE 2-continued

| | | | | | | |
|---|---|---|---|---|---|---|
| 8 | 27.73 | 15.53 | 8.78 | 22.78 | 4.02 | −14.03 |
| 9 | 25.30 | 15.88 | 6.94 | 20.37 | 1.16 | −14.58 |
| 10 | 24.54 | 16.50 | 6.04 | 22.36 | 1.34 | −13.46 |
| 11 | 26.82 | 14.26 | 6.21 | 20.15 | 0.35 | −13.63 |
| 12 | 28.02 | 2.57 | −3.63 | 22.36 | 3.22 | −12.60 |
| 13 | 26.05 | 18.51 | 5.17 | 22.90 | 2.53 | −15.26 |
| 14 | 29.60 | 13.63 | 7.93 | 20.82 | 1.69 | −15.28 |
| 15 | 24.83 | 16.47 | 6.64 | 27.63 | −0.83 | −4.90 |
| 16 | 22.19 | 16.84 | 2.82 | 21.45 | 2.06 | −14.85 |
| 17 | 24.08 | 16.87 | 4.60 | 20.20 | 0.88 | −15.88 |
| 18 | 26.74 | 16.58 | 4.93 | 19.77 | 0.16 | −16.20 |
| 19 | 24.11 | 17.22 | 4.86 | 19.77 | 1.53 | −15.60 |
| 20 | 27.09 | 15.51 | 6.57 | 17.45 | 3.91 | −14.12 |

Figure 4:
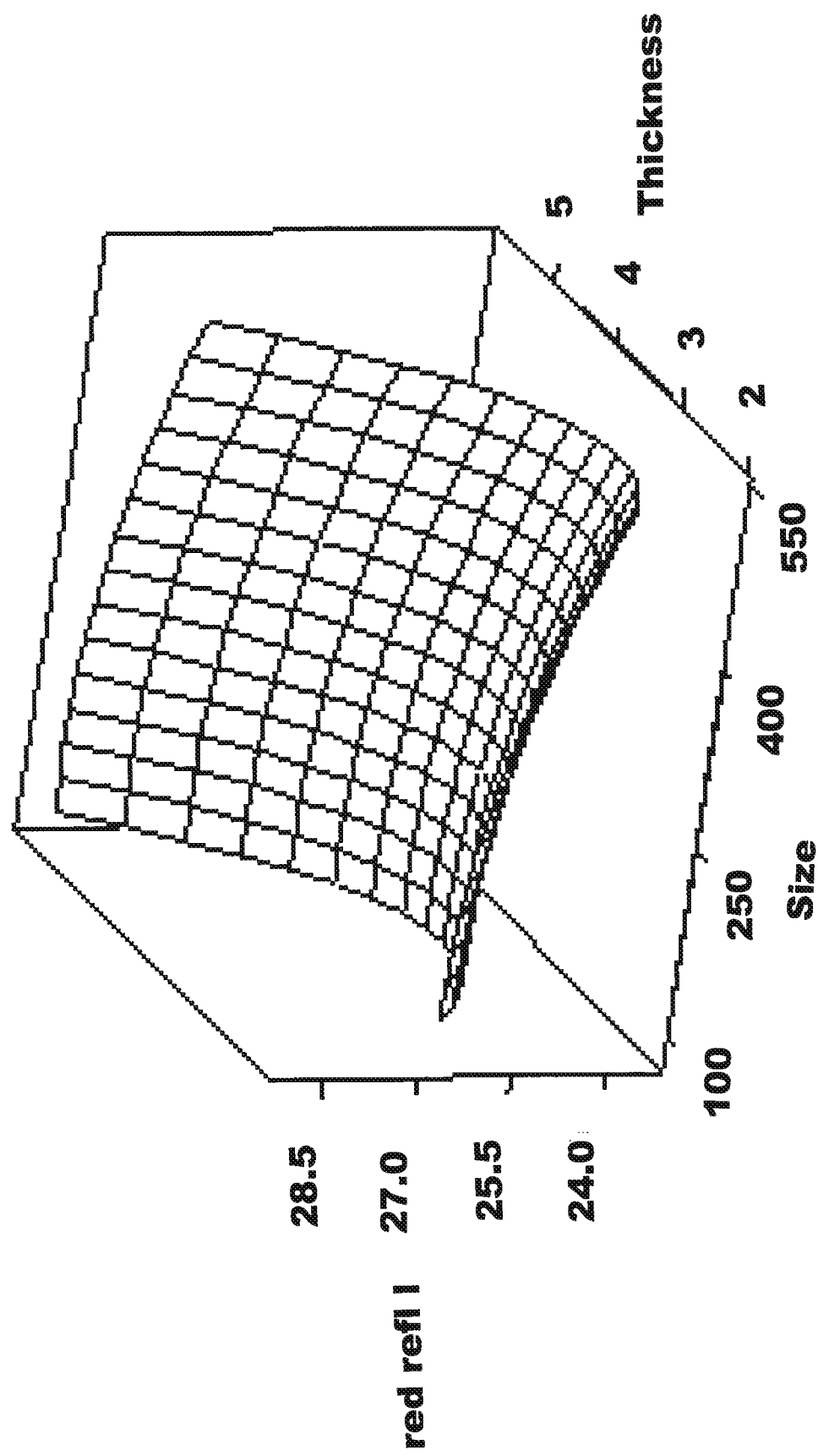
FIG. 4 is a surface plot showing the effect of laser-writable pigment particle size and coating thickness on the red reflection 1 values of a film which has been laser-treated.

Some effects of varying the particle size, concentration and thickness can be seen in Table 2 and in FIGS. 1 to 4. In FIGS. 1 and 4 the concentration value is held at 60 whereas in FIGS. 2 and 3 the thickness value is held at 4. One conclusion which can be drawn from FIGS. 1 to 4 is the lower the particle size, the better.

Response Optimization

Response optimization was carried out to determine the optimal particle size, concentration and thickness in relation to the data of this experiment. The response optimization procedure requires targets to be met. Weightings can be applied which is useful if one parameter is more important than another. However, for this exercise all responses were considered of equal importance.

Parameters

| | Goal | Lower | Target | Upper | Weight |
|---|---|---|---|---|---|
| Gloss | Maximum | 80 | 97 | 97 | 1 |
| Haze | Minimum | 1 | 1 | 10 | 1 |
| blue ref l | Minimum | 0 | 0 | 100 | 1 |
| red ref l | Minimum | 0 | 0 | 100 | 1 |
| red ref a | Maximum | 10 | 100 | 100 | 1 |
| blue ref b | Minimum | −100 | −100 | −10 | 1 |

Global Solution
Size=95.9430
Concentration=58.1313
Thickness=2.59001
Predicted Responses

| | | | | | |
|---|---|---|---|---|---|
| Gloss | = | 88.0482 | desirability | = | 0.473421 |
| Haze | = | 3.0247 | desirability | = | 0.775029 |
| Blue ref 1 | = | 22.1718 | desirability | = | 0.778282 |
| Red refl 1 | = | 26.2476 | desirability | = | 0.737524 |
| Red ref a | = | 13.8736 | desirability | = | 0.043041 |
| Blue ref b | = | −12.5885 | desirability | = | 0.028761 |

Figure 5:
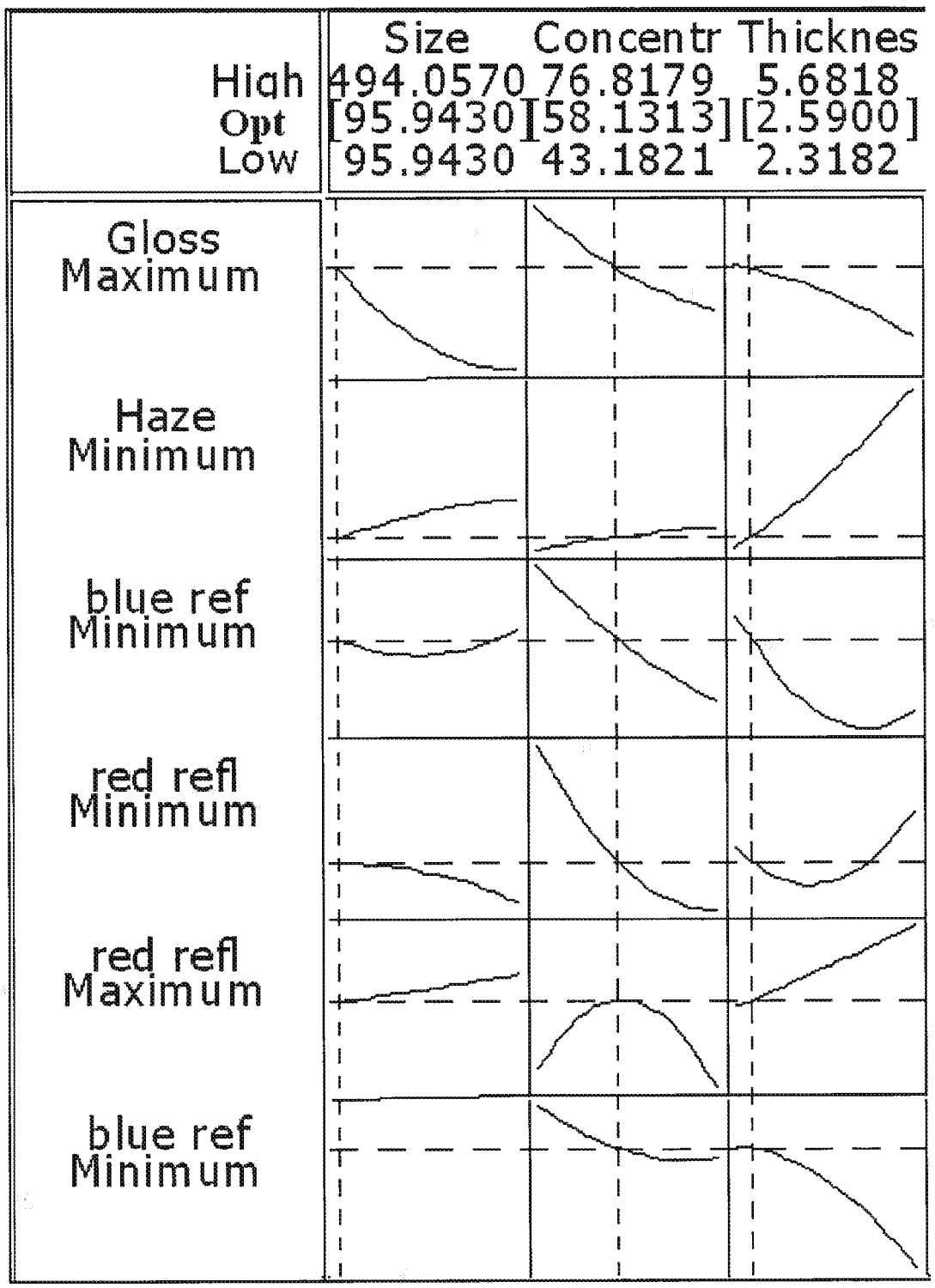
FIG. 5 shows various optical properties as functions of particle size, concentration and thickness.

The low desirability shown for the colour responses is in part due to the fact that there is not a range of 100 to −100 in the raw data. Thus although desirable it is not possible even with prediction outside of the experimental design In order to visualize the optimal values graphically, FIG. 5 shows each of gloss, haze, blue ref 1, red ref 1, red ref a and blue ref b (as outlined above) as a function of each of particle size, concentration and thickness. The vertical dotted line under each of the three variables indicates the optimal (Opt) values across all parameters. In each case, Optimal D is 0.25275.

It can be seen that size dominates all aspects but not in a linear fashion.

Therefore, in this experiment, the smallest particle size, 'mid-range' concentration and nearly the lowest thickness used gives us one optimal position. Other options are possible such as this coating on which film would not have to worry about haze so the optimisation would tend to favour concentration. With a matt film the dominant factor is size.

Combination Printing

A coated product was made using the coating composition and procedures described above This was then gravure printed. The print was various half tones from 10% ink through to 100% ink. The experiment looked for the lowest ink transfer to give a clear undisturbed print (no dots missing, no slurring of the cells etc.). The results are shown in Table 3.

TABLE 3

| Sample | Size nm | Concentration % | Fine tone gravure % FTG % |
|---|---|---|---|
| 2 | 413 | 32.4 | 10% |
| 6 | 413 | 45.4 | <10% |
| 9 | 96 | 38.9 | 10% |
| 10 | 494 | 38.9 | 10% |
| 11 | 295 | 28 | 10% |
| 17 | 295 | 38.9 | <10% |

Values lower than 40 for FTG % are deemed very good.

Coefficient of Friction

The coefficient of friction was determined in accordance with the following procedure.

1. Introduction:
1.1 The co-efficient of friction (slip) of film is a very important property which can significantly affect printing press and packaging machine performance.
1.2 Test method is based on ASTM D1894.
2. Apparatus:
2.1 Instron Tensiometer Model 1011.
2.2 Slip platform with low friction pulley assembly mounted onto it.
2.3 Sledge (6.5 cm×6.5 cm×0.5 cm, weight approx. 200 gms).
2.4 Sledge string (70 cm long, non extensible).
2.5 Cutting template (for sledge film sample) 20 cm×6.5 cm.
3. Reagents:
None.
4. Test Method:
4.1 Instrument Set-Up
4.1.1 Switch on the Instron.
4.1.2 Check the following settings are correct:—
Units=Metric
Load Range=500 gms
Transducer=5000 gms
Crosshead Speed=125 mm/min Chart Recorder Speed=200 mm/min (20 mm×10)
Full Scale Deflection=500 gms
Determination of the Co-efficient of Friction (Slip)
4.1.3 Ensure surface of the metal platform is clean.
4.1.4 Apply double sided tape across the width at each end of the platform to hold film samples flat and crease free.
4.2 Procedure
Film/Metal
4.2.1 Using the template, cut a sample of film (in the MD) and attach to the sledge (using double-sided tape). Ensure that the film is free of creases or wrinkles.
4.2.2 Ensure the top surface of the metal platform is clean.
4.2.3 Pass the string around the low friction pulley and attach to the sledge.
4.2.4 Place the sledge onto the platform, making sure there is a slight amount of slack in the string. The sledge should not be moved once it has been placed on the platform.
4.2.5 Start the chart recorder and press the "up" button for the "Instron" crosshead.
4.2.6 On completion of the test, stop the chart and return the crosshead to the original position.
4.2.7 Discard the film sample. A sample should not be used more than once.
Film/Film
4.2.8 Using the template, cut a sample of film (in the MD) and attach to the sledge (using double-sided tape).
4.2.9 Cut a sample approx. 15 cm (TD) and 35 cm (MD and attach to metal platform using double-sided tape. Ensure that the film is free of creases or wrinkles.
4.2.10 Here on follow steps 4.2.3. to 4.2.7.
5. Calculations:
5.1 The initial maximum reading from the chart is the static co-efficient of friction (u s).
u s=Initial Maximum Value Recorded (gms)/Sled Weight (gms)
5.2 The average reading obtained during uniform sliding the two surfaces over each other is the dynamic co-efficient of friction (u d).
u d=Recorded Mean Value (gms)/Sled Weight (gms)

The invention claimed is:

1. A laser writable labelling, packaging or security film incorporating a composition comprising a laser writable pigment wherein at least 50% of the laser writable pigment particles have a particle size of less than about 1 micron, wherein the film is transparent and/or colourless prior to laser writing.

2. The film according to claim 1, wherein the pigment undergoes a non-pyrolytic chemical or molecular identifiable change in at least one observable or measurable characteristic on exposure to laser radiation.

3. The film according to claim 2, wherein the pigment undergoes a first non-pyrolytic chemical or molecular identifiable change in at least one observable or measurable characteristic on exposure to a first laser radiation and wherein the pigment undergoes a second non-pyrolytic chemical or molecular identifiable change in at least one observable or measurable characteristic on exposure to a second laser radiation.

4. The film according to claim 2, wherein the observable or measurable characteristic comprises the colour of the pigment.

5. The film according to claim 1, wherein the average particle size of the laser writable pigment particles is about 100 nm or less.

6. The film according to claim 1, comprising an organic laser-writable pigment.

7. The film according to claim 6, comprising an unsaturated organic laser-writable pigment.

8. The film according to claim 7, wherein the organic laser-writable pigment comprises at least one sp or $sp^2$ hybridized carbon atom.

9. The film according to claim 8, wherein the organic laser-writable pigment comprises ethylenic and/or acetylenic unsaturation.

10. The film according to claim 9, comprising a laser-writable pigment comprising a diacetylene moiety.

11. The film according to claim 1, further comprising:
a) indium tin oxide;
and/or
b) SABoTBA.

12. The film according to claim 1, having a coating or layer wherein the coating or layer comprises the composition comprising the laser writable pigment.

13. The film according to claim 12, wherein the thickness of the layer or coating is about 10 microns or less.

14. The film according to claim 12, wherein the thickness is about 3 microns or less.

15. The film according to claim 13, wherein the layer is a skin layer.

16. The film according to claim 1, having:
a) a gloss (45°) of greater than 70 gloss units; or
b) a gloss (45°) of greater than 85 gloss units.

17. The film according to claim 1, having a coefficient of friction of between about 0.4 and about 0.9.

18. A package, label or security product comprising the film according claim 1.

19. A packaged, labelled or securitised product comprising the package, label or security product of claim 18.

* * * * *